(12) United States Patent
Lee

(10) Patent No.: US 7,508,138 B2
(45) Date of Patent: Mar. 24, 2009

(54) FRONT SUBSTRATE OF PLASMA DISPLAY PANEL AND FABRICATING METHOD THEREOF

(75) Inventor: Sung Wook Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 125 days.

(21) Appl. No.: 10/747,211

(22) Filed: Dec. 30, 2003

(65) Prior Publication Data

US 2005/0042364 A1    Feb. 24, 2005

(30) Foreign Application Priority Data

Aug. 18, 2003    (KR)    .................. 10-2003-0056946

(51) Int. Cl.
*H01J 17/49*    (2006.01)
(52) U.S. Cl. .................. 313/586; 428/325; 428/701; 428/702
(58) Field of Classification Search .................. 428/325, 428/701, 702; 313/586; 501/32, 71, 31
See application file for complete search history.

(56) References Cited

U.S. PATENT DOCUMENTS

| | | | | |
|---|---|---|---|---|
| 3,867,303 A | * | 2/1975 | Shaw et al. | 252/301.6 P |
| 4,359,663 A | * | 11/1982 | Shinoda et al. | 313/582 |
| 5,688,727 A | * | 11/1997 | Shelestak et al. | 501/71 |
| 5,807,417 A | * | 9/1998 | Boulos et al. | 501/71 |
| 5,834,071 A | * | 11/1998 | Lin | 427/578 |
| 5,838,106 A | * | 11/1998 | Funada | 313/587 |
| 6,072,276 A | * | 6/2000 | Okajima | 313/581 |
| 6,084,349 A | * | 7/2000 | Ueoka et al. | 313/587 |
| 6,309,992 B1 | * | 10/2001 | Morita et al. | 501/55 |
| 6,417,123 B1 | * | 7/2002 | Fukushima et al. | 501/32 |
| 6,596,660 B1 | * | 7/2003 | Boulos et al. | 501/70 |
| 6,650,052 B1 | * | 11/2003 | Sohn et al. | 313/586 |
| 6,673,730 B1 | * | 1/2004 | Shelestak | 501/71 |
| 6,849,566 B2 | * | 2/2005 | Shelestak et al. | 501/71 |
| 6,879,106 B2 | * | 4/2005 | Lee | 313/586 |
| 2005/0017943 A1 | * | 1/2005 | Weisbuch et al. | 345/107 |

FOREIGN PATENT DOCUMENTS

JP    2000-226229    8/2000

* cited by examiner

*Primary Examiner*—Archene Turner
(74) *Attorney, Agent, or Firm*—KED & Associates, LLP

(57) ABSTRACT

Disclosed is a front substrate of a plasma display panel and fabricating method thereof, by which color temperature, color purity, and contrast of PDP are enhanced. The present invention includes an upper dielectric layer containing a colorant therein. And, the present invention includes the step of forming an upper dielectric layer having a colorant added thereto.

12 Claims, 3 Drawing Sheets

FRONT SUBSTRATE OF PLASMA DISPLAY PANEL AND FABRICATING METHOD THEREOF

BACKGROUND OF THE INVENTION

1. Field of the Invention

The present invention relates to a plasma display panel (hereinafter abbreviated PDP), and more particularly, to a front substrate of a plasma display panel and fabricating method thereof.

2. Description of the Background Art

Lately, a next generation multimedia display device plays a great important role as a visual information transfer means according to development and popularization of information processing systems. Specifically, as CRT (cathode ray tube) is inappropriate for the recent target of providing a large-sized and planarized screen, many efforts are made to study and develop such a flat panel display as LCD (liquid crystal display), FED (field emission display), PDP, ELD (electroluminescent display), etc.

The PDP is a self-emission display device using plasma gas discharge, and has such various advantages as facilitation of size increment, excellent image quality, and fast video response speed. Moreover, the PDP as well as LCD is used as a wall-hanging display. A discharge cell of a three electrode AC surface discharge type PDP is explained by referring to FIG. 1 as follows.

FIG. 1 is a cross-sectional view of a discharge cell of a three electrode AC surface discharge type PDP according to a related art.

Referring to FIG. 1, a discharge cell of the PDP is formed by combining a front substrate 110 and a back substrate 120 and by injecting discharge gas between the front and back substrates 110 and 120.

The front substrate 110 consists of an upper glass substrate 100, a transparent electrode 101 and bus electrode 102 formed on the upper glass substrate 100, an upper dielectric layer 103 formed on the upper glass substrate 100 including the transparent and bus electrodes 101 and 102 formed thereon, and a protection layer 104 formed on the upper dielectric layer 103.

In this case, the upper dielectric layer 103 restricts plasma discharge current and accumulates wall charges on plasma discharge.

The back substrate 120 consists of a lower glass substrate 109, an address electrode 108 formed on the lower glass substrate 109, a lower dielectric layer 107 formed on the lower glass substrate 109 including the address electrode 108, a barrier rib 106 formed on the lower dielectric layer 107, and a phosphor 105 formed on the lower dielectric layer 107 and the barrier rib 106.

An operational principle of the related art PDP is explained as follows.

First of all, a discharge sustain voltage is applied to the transparent and bus electrodes 101 and 102 to accumulate electric charges on the upper dielectric layer 103, and a discharge starting voltage is applied to the address electrode 108 so that the discharge gas injected in the discharge cells of the PDP such as He, Ne, Xe, and the like is separated into electrons and ions to be in a plasma state.

The phosphor 105 is excited by UV-rays generated from the reunion of the electrons and ions to emit visible rays that represent characters or graphics. In doing so, the PDP uses Ne having a relatively heavy atomic weight as a major component of the discharge gas to prevent thermal deformation, which is caused by collision of accelerated gas ions, of the phosphor or dielectric layer.

Yet, the discharged Ne gas radiates an orange visible ray (585 nm), thereby degrading color purity and contrast of the PDP.

To overcome such a problem, a color filter layer or a black stripe layer is added to the upper substrate of the PDP.

FIG. 2 is a cross-sectional view of a front substrate of PDP according to a related art.

Referring to FIG. 2, a front substrate of PDP according to a related art consists of an upper glass substrate 100, a transparent electrode 101 and bus electrode 102 formed on the upper glass substrate 100, an upper dielectric layer 103 formed on the upper glass substrate 100 including the transparent and bus electrodes 101 and 102 formed thereon, a color filter layer 103A formed on the upper dielectric layer 103A, and a protection layer 104 formed on the color filter layer 103A. In this case, the color filter layer 103A enables to adjust optical transmittance and to prevent surface reflection by an external light.

The above-constructed PDP according to the related art controls the optical transmittance of a color filter by the color filter layer to enhance the color purity of the PDP and prevents the surface reflection by the external light to enhance the contrast of the PDP.

However, the related art PDP needs to form the color filter layer on the upper dielectric layer, whereby a fabricating method thereof becomes complicated.

Moreover, in the related art PDP, the optical transmittance of a blue visible ray B is lower than that of a red or green visible ray R or G, whereby a color temperature of the PDP is about 6,000K. In order to compensate for the low color temperature, an input signal corresponding to R, G, or B is adjusted, barrier ribs are formed asymmetrical, or optical transmittance or dye of the color filter layer is adjusted. Yet, by adopting such a compensation, brightness of the PDP is reduced despite the compensation for the color temperature.

On the other hand, the color filter layer can be replaced by the black stripe layer. Yet, an aperture plane of the black stripe layer is small, whereby emission efficiency of the PDP is reduced.

As mentioned in the foregoing explanation, the related art PDP needs to form the color filter layer on the upper dielectric layer, whereby the fabricating method thereof becomes complicated.

Moreover, the optical transmittance of the blue visible ray B is lower than that of the red or green visible ray R or G, whereby the color temperature of the PDP is low.

SUMMARY OF THE INVENTION

Accordingly, the present invention is directed to a front substrate of a plasma display panel and fabricating method thereof that substantially obviates one or more problems due to limitations and disadvantages of the related art.

An object of the present invention is to provide a front substrate of a plasma display panel and fabricating method thereof, by which a color temperature of PDP is enhanced by forming an upper dielectric layer containing a colorant amounting to a predetermined ratio for adjusting optical transmittance.

Another object of the present invention is to provide a front substrate of a plasma display panel and fabricating method thereof, by which a color purity of PDP is enhanced by forming an upper dielectric layer containing a colorant amounting to a predetermined ratio for adjusting optical transmittance.

Another object of the present invention is to provide a front substrate of a plasma display panel and fabricating method thereof, by which a contrast of PDP is enhanced by forming an upper dielectric layer containing a colorant amounting to a predetermined ratio for adjusting optical transmittance.

Another object of the present invention is to provide a front substrate of a plasma display panel and fabricating method thereof, by which PDP fabrication is simplified by forming an upper dielectric layer containing a colorant amounting to a predetermined ratio for adjusting optical transmittance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a front substrate of a plasma display panel according to the present invention includes an upper dielectric layer containing a colorant amounting to a predetermined ratio.

In another aspect of the present invention, a method of fabricating a front substrate of a plasma display panel including the step of forming an upper dielectric layer to which a colorant is added as much as a predetermined ratio. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
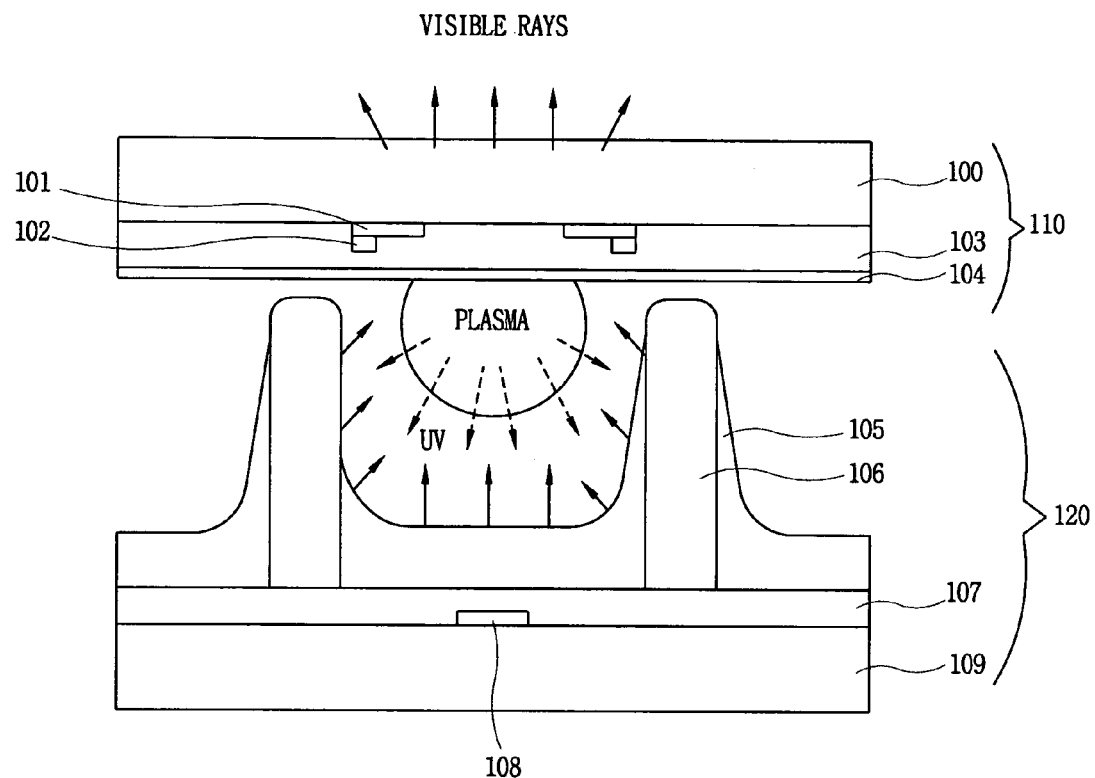
FIG. 1 is a cross-sectional view of a discharge cell of a three electrode AC surface discharge type PDP according to a related art.
Figure 2:
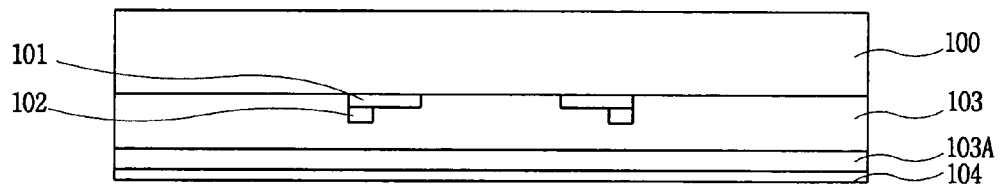
FIG. 2 is a cross-sectional view of a front substrate of PDP according to a related art.
Figure 3:
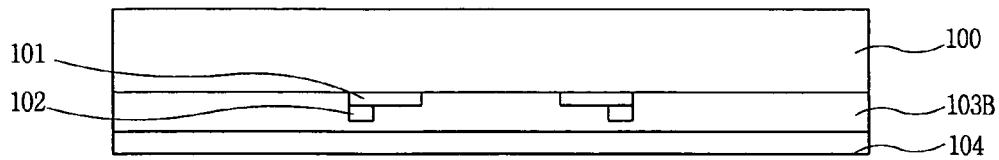
FIG. 3 is a cross-sectional view of a front substrate of PDP according to the present invention.

FIG. 3 is a cross-sectional view of a front substrate of PDP according to the present invention.

Referring to FIG. 3, a front substrate of PDP according to the present invention includes an upper glass substrate 100, a transparent electrode 101 and bus electrode 102 formed on the upper glass substrate 100, a colorant-added upper dielectric layer 103B formed on the upper glass substrate 100 including the transparent and bus electrodes 101 and 102 formed thereon, and a protection layer 104 formed on the upper dielectric layer 103.

A method of fabricating the above-constructed front substrate according to the present invention is explained by referring to FIG. 4 as follows.

Figure 4:
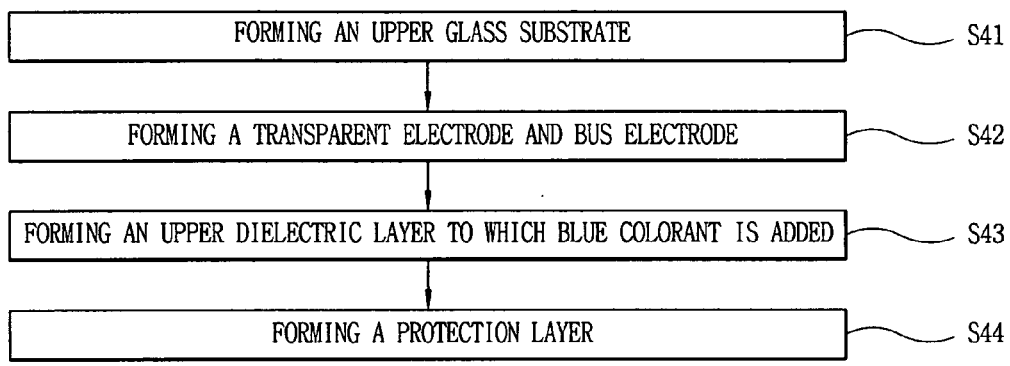
FIG. 4 is a flowchart of a method of fabricating a front substrate of PDP according to the present invention.

FIG. 4 is a flowchart of a method of fabricating a front substrate of PDP according to the present invention.

Referring to FIG. 4, a method of fabricating a front substrate of PDP according to the present invention includes the steps of forming an upper glass substrate (S41), forming a transparent electrode 101 and bus electrode 102 on the upper glass substrate 100 (S42), forming an upper dielectric layer 103B, to which a colorant amounting to a predetermined ratio is previously added, on the upper glass substrate 100 including the transparent and bus electrodes 101 and 102 formed thereon (S43), and forming a protection layer 104 on the upper dielectric layer 103 (S44).

The method of fabricating the front substrate of PDP according to the present invention is explained in detail as follows.

First of all, after the upper substrate 100 has been prepared (S41), the transparent and bus electrodes 101 and 102 are formed on the upper glass substrate 100 (S42).

The upper dielectric layer 103B, to which a colorant amounting to a predetermined ratio is previously added, is then formed on the upper glass substrate 100 including the transparent and bus electrodes 101 and 102 formed thereon. A method of forming the upper dielectric layer of the PDP is explained by referring to FIG. 5 as follows.

Figure 5:
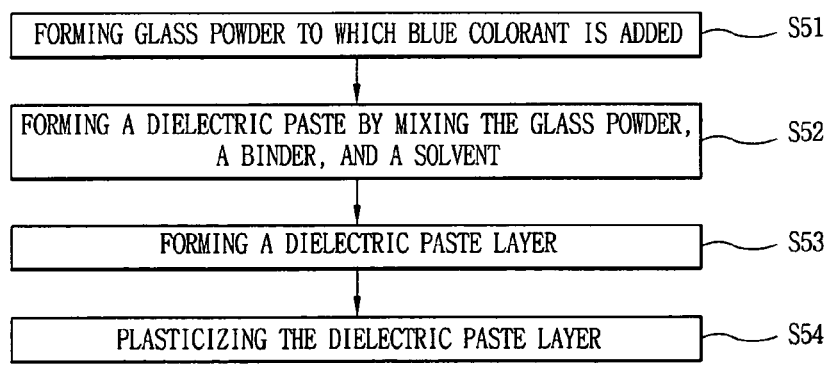
FIG. 5 is a flowchart of forming an upper dielectric layer in FIG. 3.

FIG. 5 is a flowchart of forming the upper dielectric layer in FIG. 3.

Referring to FIG. 5, a method of forming the upper dielectric layer of the PDP according to the present invention includes the steps of forming glass powder to which the colorant amounting to the predetermined ratio is added (S51), forming a dielectric paste by mixing the glass powder, a binder, and a solvent with each other (S52), forming a dielectric paste layer by coating a front surface of the upper glass substrate, on which the transparent and bus electrodes are formed, with the dielectric paste (S53), and plasticizing the dielectric paste layer to form the upper dielectric layer (S54).

The method of forming the upper dielectric layer of the PDP according to the present invention is explained in detail as follows.

First of all, the colorant for adjusting an optical transmittance is mixed with a parent glass as much as the predetermined ratio to prepare a glass. The prepared glass is then pulverized to form the glass powder having a predetermined particle size each (S51). In this case, the predetermined particle ratio is a weight ratio of the colorant vs. the mother parent. Preferably, the predetermined ratio is equal to or smaller than 5 wt % and the predetermined particle size lies 1~5 μm.

The mother glass includes the components shown in one of Table 1 ($PbO$—$B_2O_3$—$SiO_2$—$Al_2O_3$—$BaO$ based glass), Table 2 ($P_2O_5$—$B_2O_3$—$ZnO$ based glass), and Table 3 ($ZnO$—$B_2O_3$—$RO$ based glass). In this case, each component unit is wt % (weight %).

TABLE 1

| PbO wt % | B₂O₃ wt % | SiO₂ + Al₂O₃ wt % | BaO wt % |
|---|---|---|---|
| 35.0 | 35.0 | 20.0 | 10.0 |
| 40.0 | 30.5 | 15.0 | 14.5 |
| 45.0 | 25.0 | 10.0 | 20.0 |
| 50.0 | 27.0 | 5.0 | 18.0 |
| 60.0 | 30.0 | 0.0 | 10.0 |

TABLE 2

| B₂O₃ wt % | ZnO wt % | P₂O₅ wt % |
|---|---|---|
| 0.0 | 46.2 | 53.8 |
| 3.3 | 44.7 | 52.0 |
| 6.8 | 43.1 | 50.1 |
| 10.4 | 41.4 | 48.2 |
| 14.1 | 39.7 | 46.2 |
| 18.0 | 37.9 | 44.1 |
| 22.0 | 36.1 | 41.9 |

TABLE 3

| ZnO wt % | B₂O₃ wt % | RO wt % |
|---|---|---|
| 19.8 | 42.4 | 37.8 |
| 24.6 | 37.9 | 37.5 |
| 29.3 | 33.4 | 37.3 |
| 34.0 | 29.0 | 37.0 |

RO as a component of the mother glass in Table 3 is selected from the group consisting of BaO, SrO, La$_2$O, Bi$_2$O$_3$, MgO, and ZnO. Preferably, a substance used as the colorant is at least one of CuO, CoO, Nd$_2$O$_3$, NiO, Cr$_2$O$_3$, Pr$_2$O$_3$, and Fe$_2$O$_3$.

After forming the glass powder including the mother glass and the colorant, the glass powder and ethylcellulose binder are mixed in the solvent dissolving the binder such as α-terpineol, BCA (butyl cabitol acetate), BC (butyl cabitol), and TX (texanol) to form the dielectric paste (S52).

The dielectric paste is coated on the upper glass substrate having the transparent and bus electrodes formed thereon by screen-printing or thick film coating to form the dielectric paste layer (S53).

The dielectric paste layer is plasticized for 10~30 minutes at 550~600° C. to form the upper dielectric layer of the PDP (S54).

Thereafter, the protection layer is formed on the upper dielectric layer to complete the front substrate of the PDP. An experimental result of optical transmittance of PDP according to the present invention is explained by referring to FIG. 6 as follows.

Figure 6:
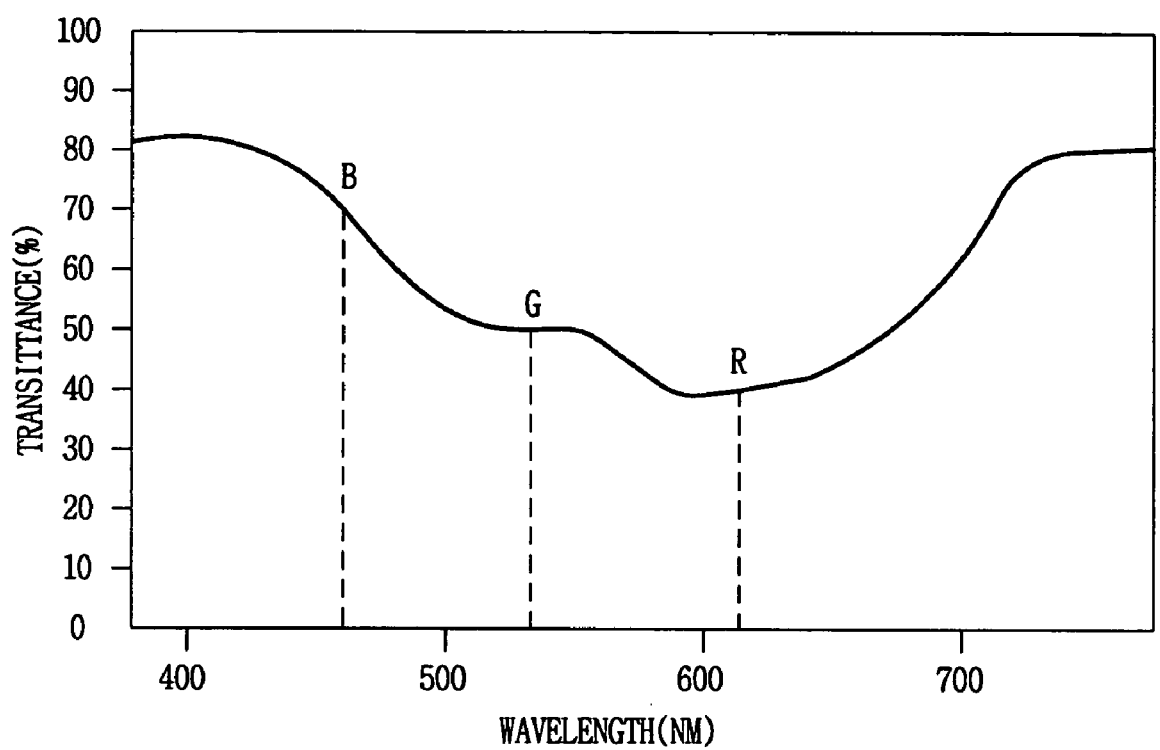
FIG. 6 is a graph of experimental optical transmittance of PDP according to the present invention.

FIG. 6 is a graph of experimental optical transmittance of PDP according to the present invention.

Referring to FIG. 6, optical transmittance of a blue visible ray (454 nm) B is higher than that of a red or green visible ray (611 nm or 525 nm) R or G. It is expected that color temperature, color purity, and contrast of the PDP will be remarkably enhanced according to the test result. In this case, it is expected that the color temperature of the PDP is enhanced over about 1,000K.

Accordingly, the front substrate of the PDP and fabricating method thereof according to the present invention has the following advantages or effects.

First of all, the colorant amounting to the predetermined ratio is added to the upper dielectric layer to adjust the optical transmittance, whereby the color impurity of the PDP is enhanced.

Secondly, the colorant amounting to the predetermined ratio is added to the upper dielectric layer to adjust the optical transmittance, whereby the color temperature of the PDP is enhanced.

Thirdly, the colorant amounting to the predetermined ratio is added to the upper dielectric layer to adjust the optical transmittance, whereby the optical transmittance of the blue visible ray B is increased to enhance the contrast of the PDP.

Finally, the colorant amounting to the predetermined ratio is added to the upper dielectric layer to adjust the optical transmittance, whereby an additional filter layer needs not to be formed to simplify the fabricating method of the PDP.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A front substrate of a plasma display panel including an upper dielectric layer containing a colorant therein, the colorant including a blue colorant less than 5 wt% so that optical transmittance for a red wavelength (Rt) and optical transmittance for a green wavelength (Gt) are less than 60% and optical transmitttance for a blue wavelength (Bt) is greater than the optical transmittances of the Rt and the Gt wavelengths (Rt<Gt<Bt), wherein the blue colorant consists essentially of CuO and NiO.

2. The front substrate of claim 1, wherein the red wavelength is 611 nm, the green wavelength is 525 nm, and the blue wavelength is 454 nm.

3. The front substrate of claim 1, wherein the optical transmittance for the red wavelength (Rt) is 45-50%, the optical transmittance for the green wavelength (Gt) is 50-60%, and the optical transmittance for the blue wavelength is 70-80%.

4. The front substrate of claim 1, wherein the upper dielectric layer contains a mother glass.

5. The front substrate of claim 4, wherein the mother glass contains substantially equal percentages of PbO and B$_2$O$_3$ by weight.

6. The front substrate of claim 4, wherein the mother glass contains a percentage of PbO greater than a percentage of B$_2$O$_3$ by weight.

7. The front substrate of claim 4, wherein the mother glass contains a percentage of PbO which is approximately twice a percentage of B$_2$O$_3$ by weight.

8. The front substrate of claim 4, wherein the mother glass is selected from the group consisting of PbO—B$_2$O$_3$—SiO$_2$—Al$_2$O$_3$ based glass, P$_2$O$_5$—B$_2$O$_3$—ZnO base glass, and ZnO—B$_2$O$_3$—RO based glass, wherein RO is a compound that includes an oxide.

9. The front substrate of claim 8, wherein RO is selected from the group consisting of BaO, SrO, La$_2$O, Bi$_2$O, MgO, ZnO.

10. The front substrate of claim 1, wherein the blue colorant has a particle size that lies within the range of 1 to 5 μm.

11. The front substrate of claim 1, wherein the mother glass contains predetermined percentages of ZnO and P$_2$O$_5$ by weight.

12. The front substrate of claim 1, wherein the blue colorant further comprises at least one of CoO, Nd$_2$O$_3$, Cr$_2$O$_3$ and Fe$_2$O$_3$.

* * * * *